United States Patent [19]
Mayhew

[11] Patent Number: 5,168,969
[45] Date of Patent: Dec. 8, 1992

[54] CABLE RE-WINDER BOX FOR ELECTRONIC GAME CONTROLLERS

[76] Inventor: Joseph C. Mayhew, 2817 Dana Ct., Ellicott City, Md. 21043

[21] Appl. No.: 806,278

[22] Filed: Dec. 13, 1991

[51] Int. Cl.⁵ .................................... H02G 11/02
[52] U.S. Cl. ........................ 191/12.2 R; 273/148 B
[58] Field of Search .................. 191/12.2 R, 12.4; 273/148 B, 309, 433, 435, 438, DIG. 21

[56] References Cited
U.S. PATENT DOCUMENTS

| | | | |
|---|---|---|---|
| 3,432,623 | 3/1969 | Blanch et al. | 191/12.2 R |
| 3,821,496 | 6/1974 | Malone | 191/12.2 R |
| 4,384,688 | 5/1983 | Smith | 191/12.2 R |
| 4,394,055 | 7/1983 | Smith | 273/148 B X |
| 4,509,383 | 4/1985 | Yeh | 191/12.2 R |
| 4,735,377 | 4/1988 | Zuehsow | 191/12.2 R |
| 5,033,474 | 7/1991 | Varelis et al. | 191/12.2 R |

OTHER PUBLICATIONS

Frasure, "Cable Retractor" Western Electric Technical Digest No. 22, Apr. 1971, pp. 15-16.
Dollenmayer, "Cable Storage Reel" IBM Technical Disclosure Bulletin vol. 6 No. 7, Dec. 1963, pp. 69-70.

Primary Examiner—F. J. Bartuska
Assistant Examiner—Scott L. Lowe
Attorney, Agent, or Firm—Brady, O'Boyle & Gates

[57] ABSTRACT

A re-winder box for an electronic game box wherein a pair of electrical cables are each connected between the game box and a respective player manipulative controller. The re-winder box is dimensioned to support the electronic game box on the top thereof, and is provided with a pair of wind-up spools for the controller connected cables, and a pair of recesses in the front wall thereof for storing the controllers when not in use. The re-winder box provides a neat and uncluttered appearance to the game box and surrounding area when the game box is not in use.

4 Claims, 4 Drawing Sheets

CABLE RE-WINDER BOX FOR ELECTRONIC GAME CONTROLLERS

BACKGROUND OF THE INVENTION

Various electronic games, such as NINTENDO®, include a pair of electrical cables, each having one end connected to the electronic game box, and the opposite end connected to a controller which is manipulated by a respective player when playing the game. The length of these cables is dimensioned to provide each player with plenty of space to operate the controller while playing the game. While the length of the cable presents no problem during the playing of the game, there is a potential problem after the game is finished and there is no interest at the time in playing the game any further. The cables and associated controllers are usually left on a supporting table or floor and extending a distance from the game box, resulting in a cluttered appearance, or even an obstacle over which a person could trip.

SUMMARY OF THE INVENTION

In order to overcome the disadvantage of having the cables and associated controllers of an electronic game providing a cluttered appearance when the game box is not in use, the cable re-winder box of the present invention has been devised which comprises, essentially, a housing containing a pair of re-wind spools. Each cable is wound on a respective spool, and a pair of recesses are provided in the front of the housing for receiving the controllers. The housing is dimensioned so that the game box can sit on the top of the housing. By this construction and arrangement, when the game box is not in use, the cables are re-wound on the spools, whereby the cables are pulled into the re-winder box and the controllers are placed in the recesses; thus, the cables and associated controllers are stored within the confines of the rewinder box providing a neat and uncluttered appearance to the game box and surrounding area when the game box is not in use.

DESCRIPTION OF THE PREFERRED EMBODIMENT

Figure 1:
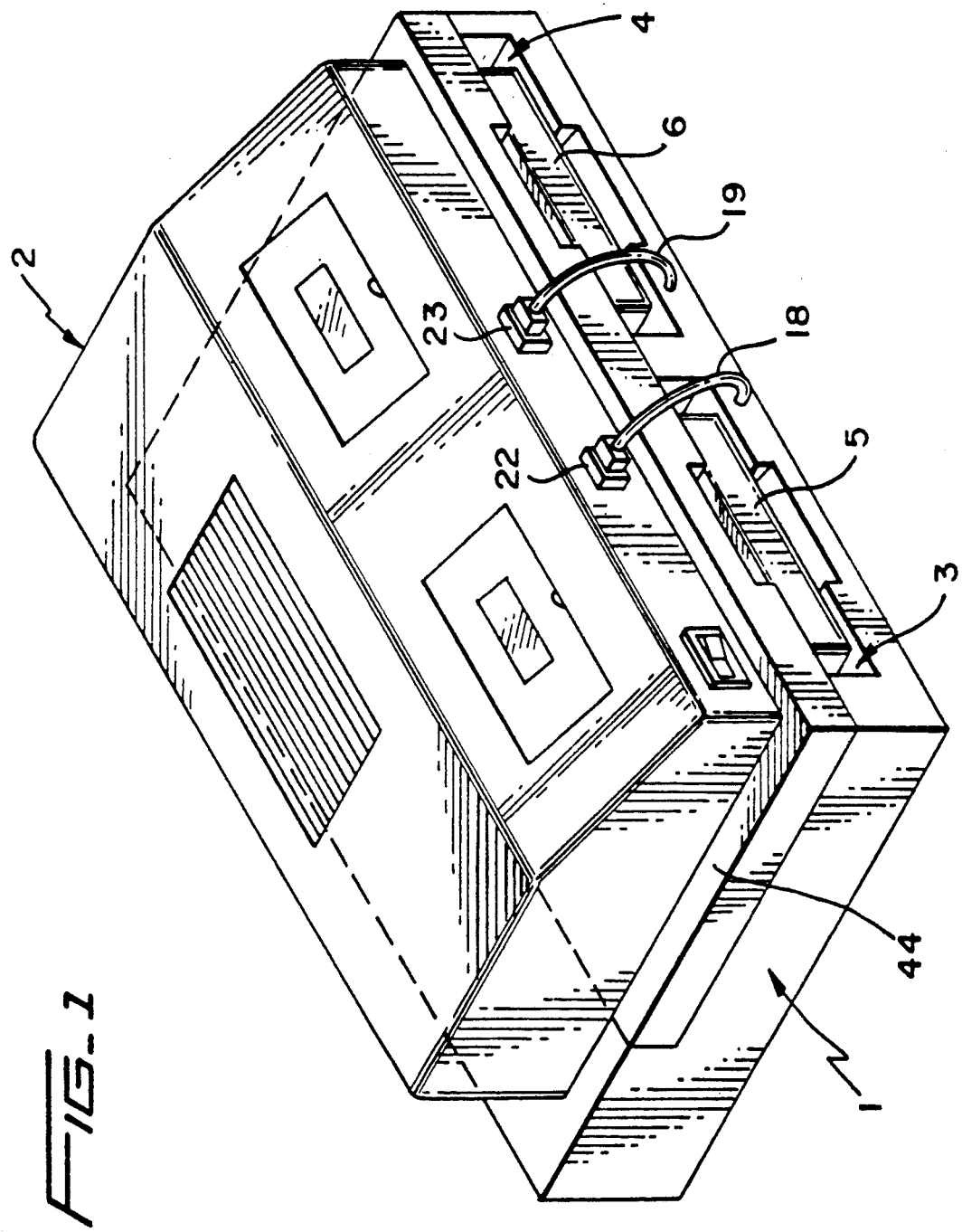
FIG. 1 is a perspective view of the re-winder box of the present invention showing an electronic game box supported on the top thereof.

Referring to the drawings and more particularly to FIG. 1, the cable re-winder box 1 of the present invention is dimensioned to support an electronic game box 2 on the top thereof, and includes a pair of recesses 3 and 4 in the side thereof for storing a pair of controllers 5 and 6.

Figure 2:
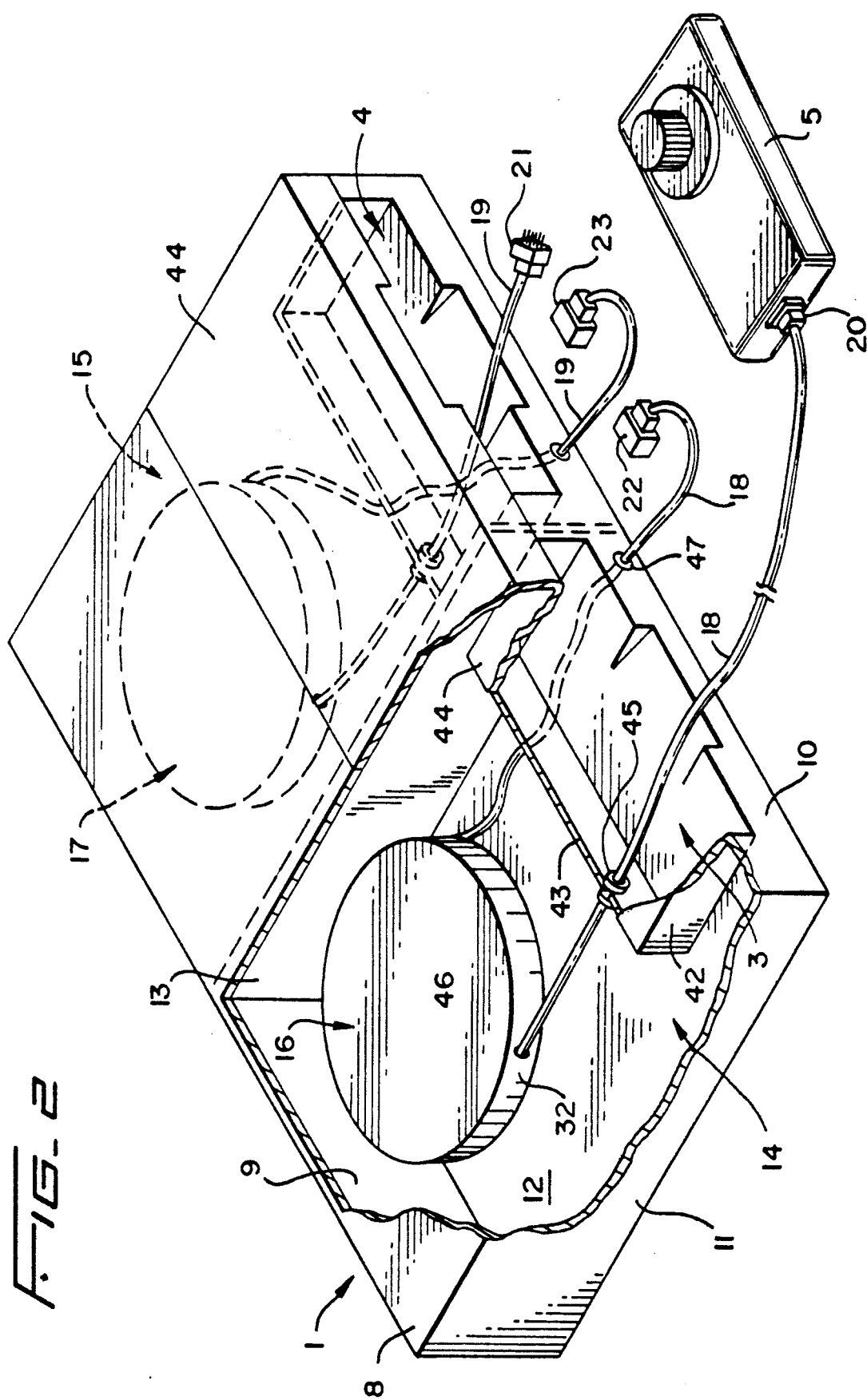
FIG. 2 is a fragmentary perspective view of the re-winder box showing one of the cables connected to a controller.
Figure 4:
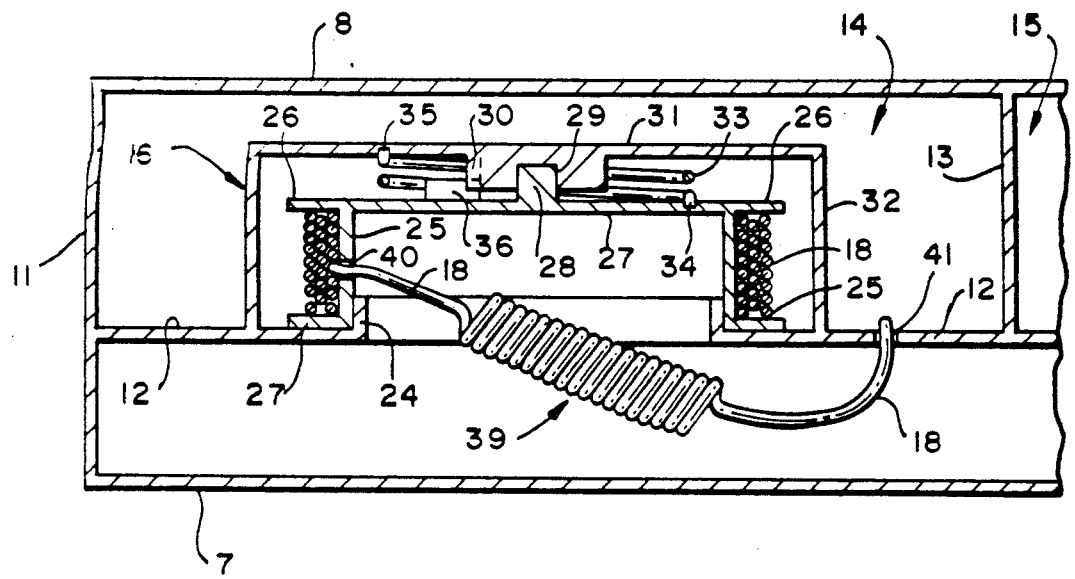
FIG. 4 is a view taken along line 4—4 of FIG. 3.

The details of the construction of the re-winder box 1 are shown in FIGS. 2 and 4 and include a bottom wall 7, a top wall portion 8, a rear wall 9, a front wall 10 and side walls 11. A platform 12 is positioned above the bottom wall 7 and is coextensive therewith. A partition 13 is integral with the platform 12 and extends between the front and rear walls to thereby divide the re-winder box into a pair of compartments 14 and 15 which house wind-up spool assemblies 16 and 17 for electrical cables 18 and 19.

Figure 3:
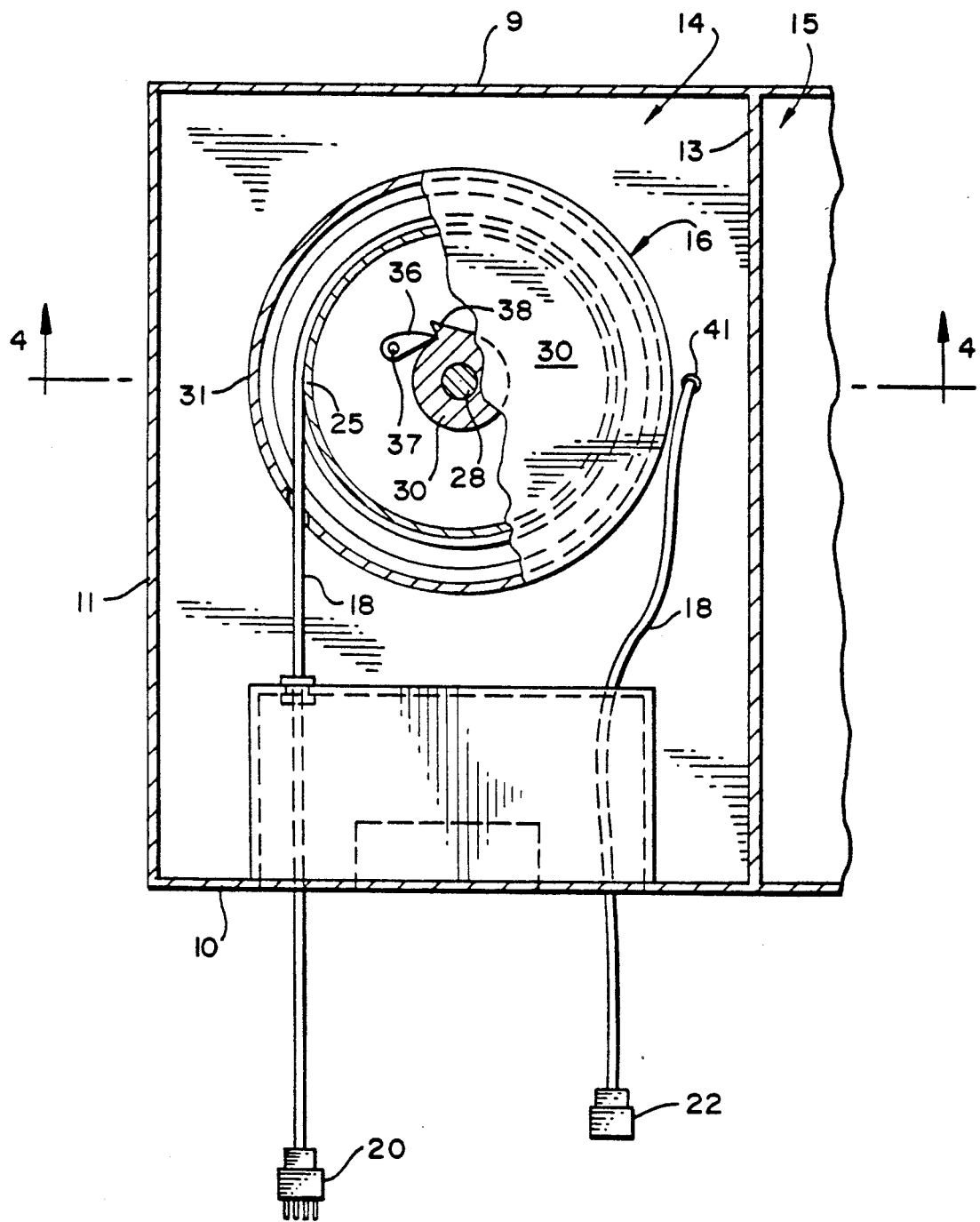
FIG. 3 is a fragmentary, sectional, top plan view of the re-winder box and associated wind-up spool.

One end of each cable 18 and 19 is provided with a plug 20 and 21 adapted to be connected to a respective controller 5 and 6, and the opposite end of each cable is provided with a plug 22 and 23 adapted to be connected to the electronic game box 2, as shown in FIG. 1. The length of each cable 18 and 19 intermediate the ends thereof is wound in the respective wind-up spool assemblies 16 and 17, the details of which are shown in FIGS. 3, 4 and 5, it being understood that wind-up spool assembly 17 is identical to wind-up spool assembly 16.

Each wind-up spool assembly comprises an upstanding hub portion 24 provided on the platform 12 upon which a spool 25 is rotatably mounted. The cable 18 is wound on the spool 25 and extends between upper and lower spool flanges 26 and 27, respectively. The lower spool flange 27 is supported on the upper surface of the platform 12 and is slidable thereon during rotation of the spool, and the upper spool flange 26 is integral with a top wall 27 closing the upper end of the spool. A centrally disposed stub axle 28 is integral with the top wall 27 and extends upwardly into a recess 29 formed in a hub 30 integral with and depending from the top wall 31 of a cylindrical housing which has an arcuate side wall 32 integral with the top wall 31 of the cylindrical housing and the platform 12, whereby the spool 25 is rotatably mounted within the cylindrical housing 16. The spool is biased in a direction to wind-up the cable 18 thereon by a coiled torsion spring 33 having one end secured, as at 34, to the top wall 27 of the spool 25, and the other end secured as at 35 to the top wall 31 of the cylindrical housing 16.

To hold the spool 25 and associated torsion spring 33 from rewinding the cable 18 when it is pulled outwardly of the re-winder box 1, a pawl 36 is pivotally connected as at 37 to the top wall 27 of the spool 25 and is adapted to engage a tooth 38 integral with the depending hub 30.

Figure 5:
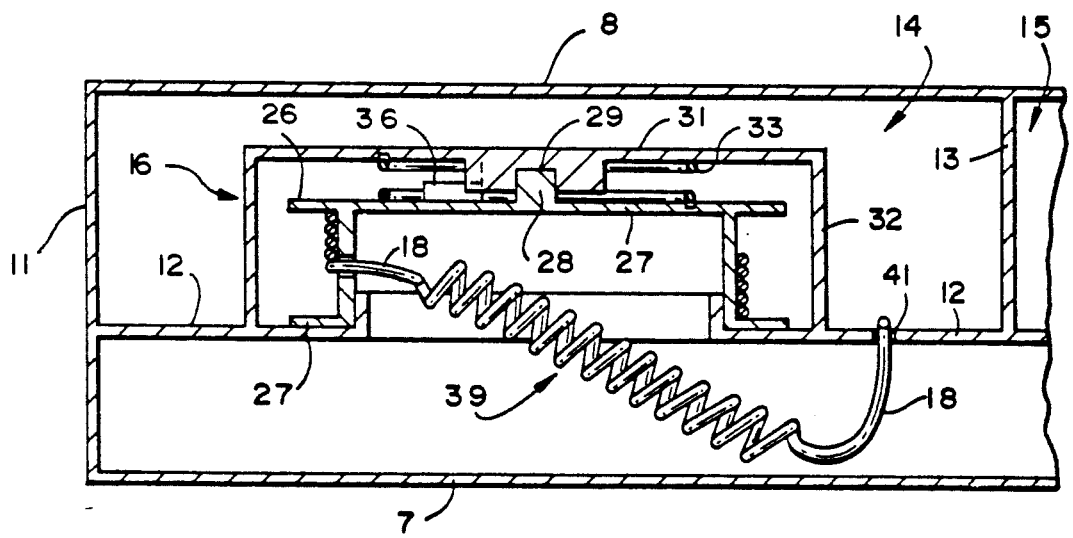
FIG. 5 is a view similar to FIG. 4 showing the coiled portion of the cable for the electronic game box stretched to facilitate the connection to the game box as shown in FIG. 1.

Since the main portion of the cable 18 which is wound and unwound on the spool is that portion which is connected to the controller 5, the remaining portion of the cable which is connected to the electronic game box 2 is provided with a coiled portion 39 to allow that portion to be stretched, as shown in FIG. 5, when connected to the game box 2. To accommodate the cable coiled portion 39 within the re-winder box 1, an opening 40 is provided in the spool 25 through which the cable 18 extends to the coiled portion 39, and an opening 41 is provided in the platform 12 through which the cable 18 extends from the coiled portion 39 to the front of the re-winder box 1. The coiled portion 39 is thereby suspended within the re-winder box 1 between the bottom wall 7 thereof and the interior of the spool 25.

While the wind-up spool assemblies 16 and 17 store the cables 18 and 19 when the game box 2 is not in use, the recesses 3 and 4 provided in the front of the re-winder box 1 are employed for storing the controllers 5 and 6. Each recess is formed by a portion of the platform 12, integral with side walls 42 and a back wall 43. The top of the recess is closed by a removable cover 44. The portion of the cable 18 connected to the controller 5 extends through a grommet 45 mounted in the back wall 43 of the recess and through an aperture 46 provided in the side wall 32 of the cylindrical housing to the spool 25 contained therein. The portion of the cable 18 connected to the electronic game box 2 extends through a grommet 47 mounted in the front wall 10 of the re-winder box and then beneath the platform 12 to an opening in the platform 12 behind the back wall 43 through which the cable 18 extends upwardly above the platform 12 and then downwardly through the opening 41.

In using the cable re-winder box 1 of the present invention, an electronic game box 2 is placed on top of the re-winder box 1 as shown in FIG. 1, and a portion of each cable 18 and 19 is pulled from the re-winder box 1 and connected to the electronic game box through plugs 22 and 23. The controllers 5 and 6 are manually removed from their respective storage recesses 3 and 4, and the portions of the cables 18 and 19 to be connected to the controllers by plugs 20 and 21 are pulled a desired length from the spools to provide the players enough room to manipulate the controllers while playing the game. The pawl 36 and cooperating tooth 38 will prevent the cables from being retracted back into the re-winder box 1. At the completion of the game, the portion of each cable 18 and 19 which is connected to the respective controller 5 and 6 is pulled slightly to disengage the pawl 36 from the tooth 38 to thereby allow the torsion spring 33 to rotate the spool 25, whereby the cables 18 and 19 are re-wound on their respective spools. After the cables 18 and 19 have been retracted into the re-winder box 1, the controllers 5 and 6 are inserted into the recesses 3 and 4. The cables 18 and 19 and associated controllers are thus stored within the confines of the re-winder box 1, thereby providing a neat and uncluttered appearance to the game box 2 and surrounding area.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. The combination of an electronic game box having at least one electrical cable connected between the game box and a controller, and a re-winder box, said re-winder box comprising a housing having a bottom wall, side walls, top wall, back wall, and front wall, wind-up spool means mounted in said housing, the portion of said cable between the game box and said controller being connected to said wind-up spool means, whereby the cable is retracted into said housing when not in use, and extendable therefrom when in use, a recess provided in the front wall of said housing and extending inwardly therefrom into the housing, said controller being insertable into the recess and stored therein, the re-winder box being dimensioned so that the game box is supported on the top of the re-winder box, whereby the cable and associated controller are stored within the confines of the re-winder box, to thereby provide a neat and uncluttered appearance to the game box and surrounding area when the game box is not in use.

2. The combination of claim 1, wherein a pair of cables are each connected between the electronic game box and a respective controller, a pair of wind-up spools mounted in said housing, the portions of said cables between the game box and said controllers being connected to a respective wind-up spool, and a pair of recesses provided in the front wall of said housing, each controller being insertable into a stored position within a respective recess.

3. The combination according to claim 1, wherein the wind-up spool means comprises, a platform mounted in said housing, a hub portion integral with said platform, a spool, said spool being rotatably mounted on said hub portion, a cylindrical housing integral with said platform and enclosing said spool, said cylindrical housing having a top wall, said spool having a top wall positioned below the top wall of said cylindrical housing, shaft means rotatably connecting said spool to the top wall of said cylindrical housing, a torsion spring connected between the top wall of said cylindrical housing and the top wall of said spool, said torsion spring biasing said spool in a direction to wind said cable portion thereon, and a pawl and tooth assembly operatively connected between the top wall of said spool and the top wall of said cylindrical housing to selectively prevent the spring biased spool from winding the cable portion thereon.

4. The combination of claim 3, wherein a pair of cables are each connected between the electronic game box and a respective controller, a pair of wind-up spools mounted in said housing, the portions of said cables between the game box and said controllers being connected to a respective wind-up spool, and a pair of recesses provided in the front wall of said housing, each controller being insertable into a stored position within a respective recess.

* * * * *